No. 666,377. Patented Jan. 22, 1901.
P. A. CAZES.
SUGAR CANE MILL.
(Application filed June 24, 1899.)
(No Model.) 5 Sheets—Sheet 3.
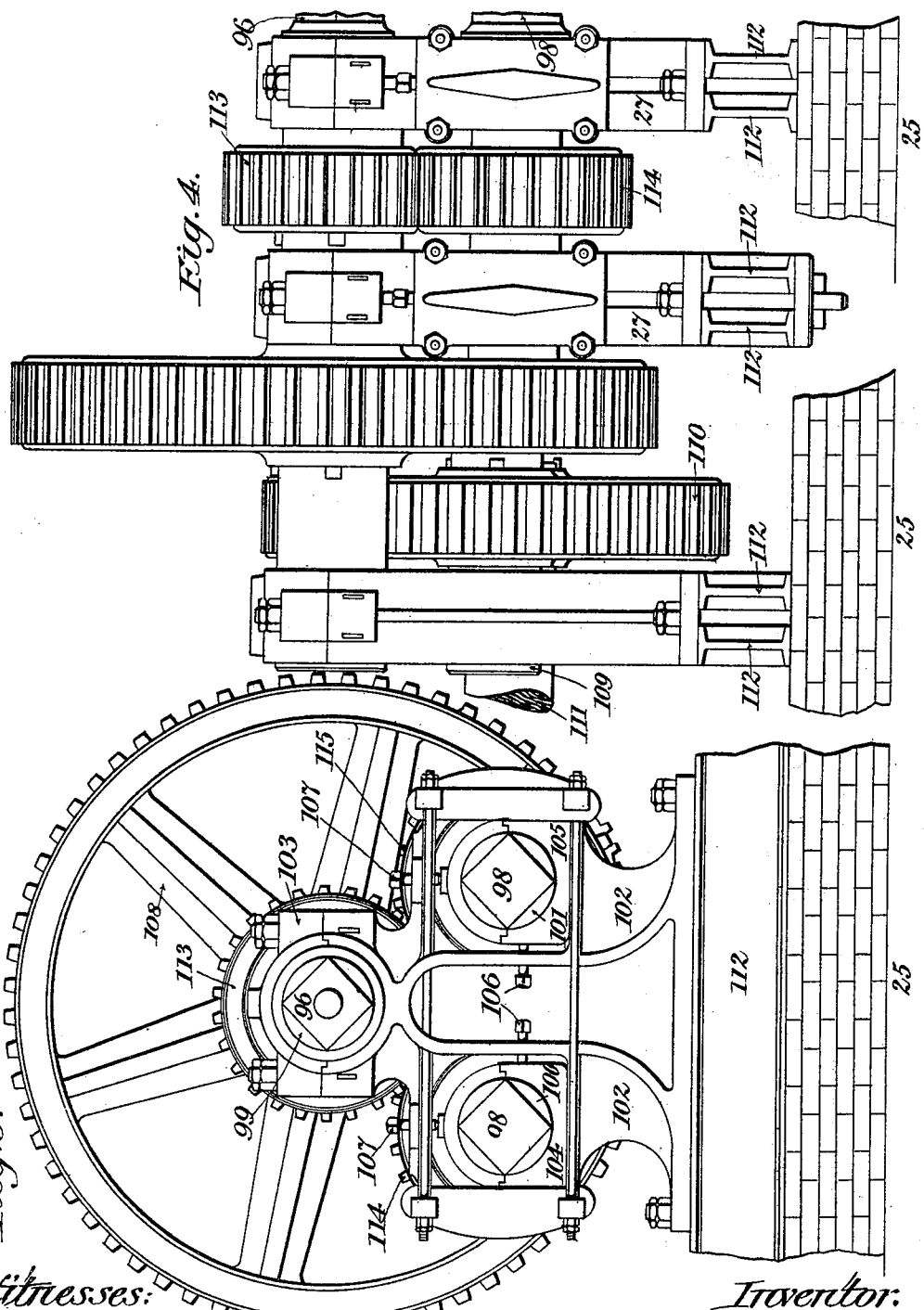

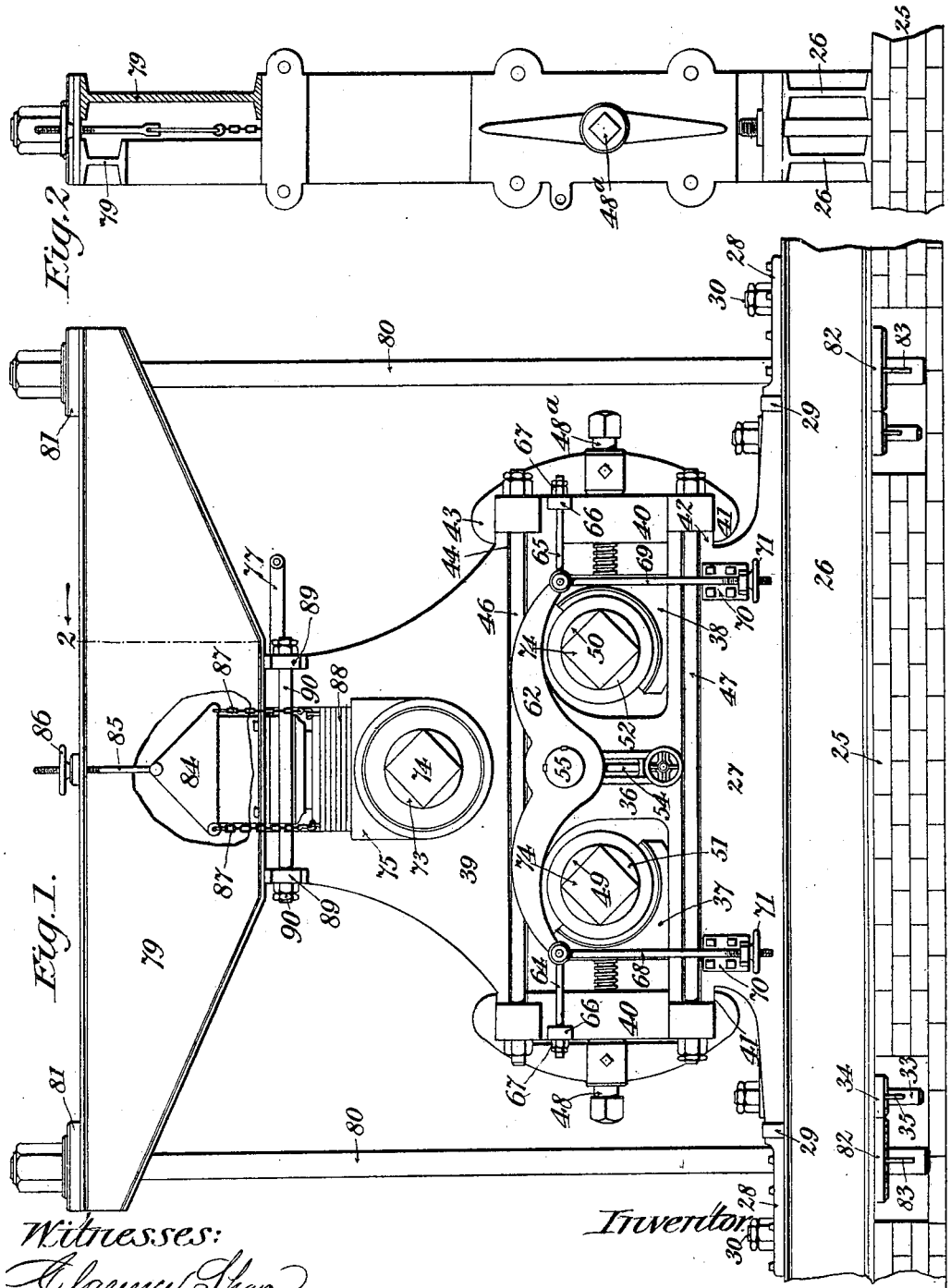

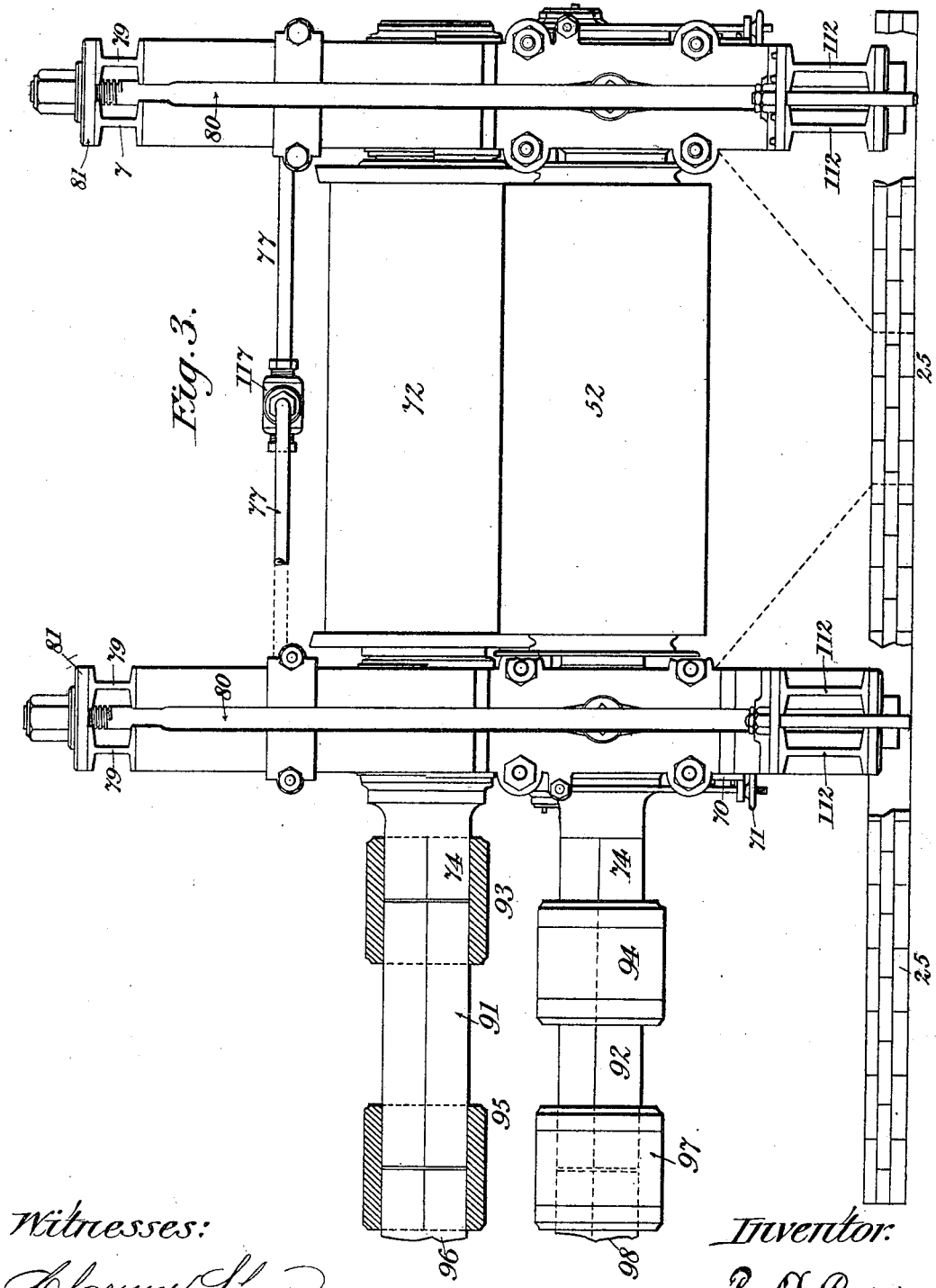

No. 666,377. Patented Jan. 22, 1901.
P. A. CAZES.
SUGAR CANE MILL.
(Application filed June 24, 1899.)
(No Model.) 5 Sheets—Sheet 4.
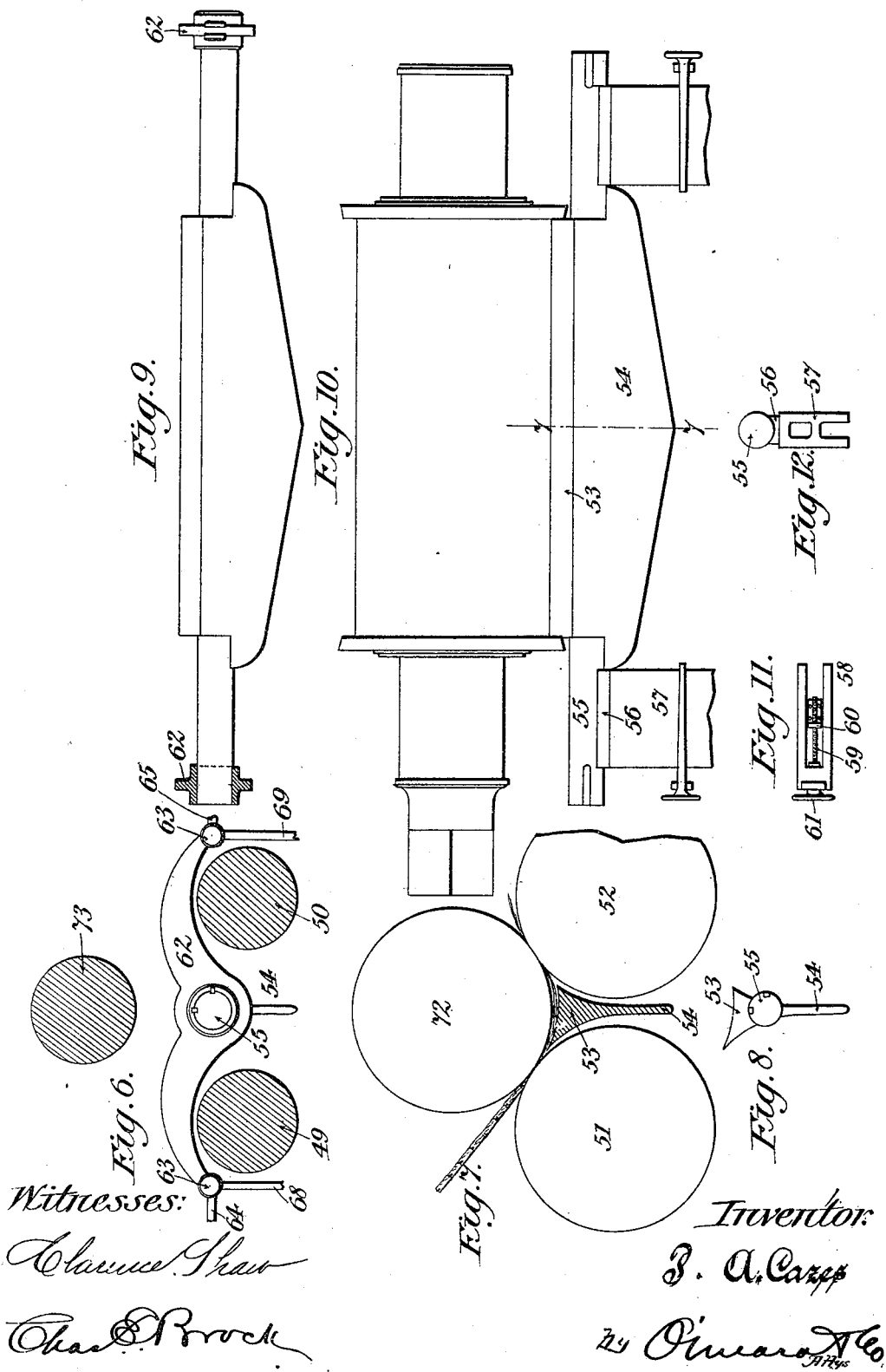

No. 666,377. Patented Jan. 22, 1901.
P. A. CAZES.
SUGAR CANE MILL.
(Application filed June 24, 1899.)
(No Model.) 5 Sheets—Sheet 5.
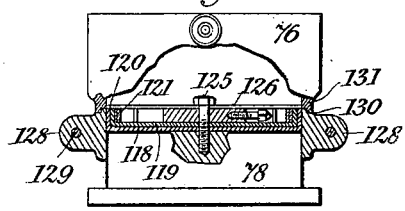
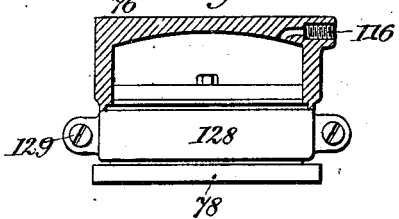
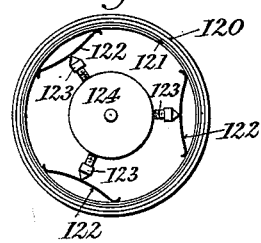
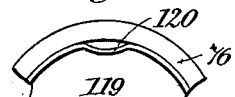
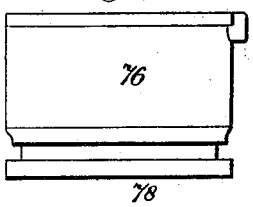
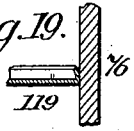
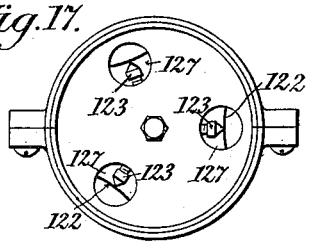
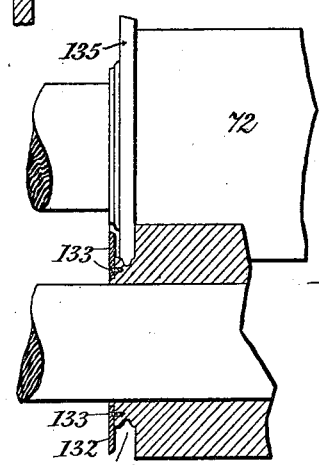
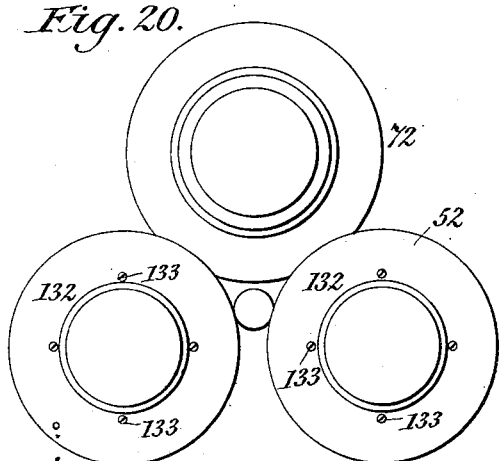
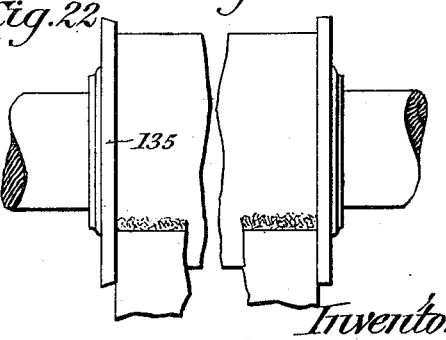
Witnesses:
Clarence Shaw
Chas. D. Brock
Inventor:
P. A. Cazes
by Munn & Co.
Attys
THE NORRIS PETERS CO., PHOTO-LITHO., WASHINGTON, D. C.

UNITED STATES PATENT OFFICE.

PETER A. CAZES, OF BATON ROUGE, LOUISIANA.

SUGAR-CANE MILL.

SPECIFICATION forming part of Letters Patent No. 666,377, dated January 22, 1901.

Application filed June 24, 1899. Serial No. 721,740. (No model.)

*To all whom it may concern:*

Be it known that I, PETER A. CAZES, a citizen of the United States, residing at Baton Rouge, in the parish of East Baton Rouge and State of Louisiana, have invented a new and useful Sugar-Cane Mill, of which the following is a specification.

My invention relates to that class of mills known as roller cane-mills used for compressing the juice from sugar-cane, the object of the invention being to generally improve the construction and operation of mills of this class.

With this object in view my invention consists in the improved construction, arrangement, and combination of parts herein described and afterward specifically pointed out in the claims.

In order to enable others skilled in the art to which my invention most nearly appertains to make and use the same, I will now proceed to describe its construction and operation, reference being had to the accompanying drawings, forming part hereof, in which—

Figure 1 is a view in side elevation of a mill constructed in accordance with my invention, parts being broken away. Fig. 2 is a view in end elevation of the housings and supports at one end of the rollers, the inner cap-beam being shown in section on the dotted line 2 2 of Fig. 1. Fig. 3 is a view of the mill in front elevation, parts being broken away, the couplings on the upper-roll shaft being shown in section and the near coupling on the lower roll in its uncoupled or inoperative position. Fig. 4 is a view in front elevation of the compound gearing. Fig. 5 is a view of the same in end elevation. Fig. 6 is a detail view in end elevation of the turn-plate and rocker-bar, the journals of the rolls being shown in diagram. Fig. 7 is a detail view showing the rolls diagrammatically and the turn-plate in transverse section on dotted line 7 7 of Fig. 10. Fig. 8 is a view in end elevation of the turn-plate detached Fig. 9 is a front view of the turn-plate with the rocker-bars secured on each end, the one on the left being shown in section. Fig. 10 is a view in front elevation of the upper roller, the turn-plate, the sliding bearings therefor, their supporting-brackets, and the vertically-adjusting wedges.
Fig. 11 is a detail plan view of the adjusting-wedge and its operating mechanism. Fig. 12 is a detail end elevation of a journal of the turn-plate, its sliding bearing, and its supporting-bracket. Fig. 13 is a detail view, partly in elevation and partly in section, illustrating the packing of the plunger and the means for passing it into the cylinder. Fig. 14 is a detail view, partly in section and partly in elevation, illustrating the same parts with the plunger in the cylinder and the encircling guide-strap still in place. Fig. 15 is a detail view in elevation of the plunger in the cylinder with guide-strap removed. Fig. 16 is a top plan view of the plunger with the top plate removed. Fig. 17 is a similar view with the top plate in place. Fig. 18 is a fragmentary detail top plan view showing part of plunger-packing and cylinder with packing of ordinary construction, illustrating one of the accidental displacements of the packing avoided by my construction. Fig. 19 is a fragmentary sectional view of the same. Fig. 20 is a detail end elevation of the rollers with juice-plates and conical collars in place. Fig. 21 is a fragmentary detail view showing part of the top roll in front elevation and part of a lower roll in section, the juice-plate and conical collar being in place thereon. Fig. 22 is a fragmentary front elevation of part of the top roller and of one of the lower rollers. Fig. 23 is a similar view illustrating the old construction.

Like numerals of reference mark the same parts wherever they appear in the several figures of the drawings.

Referring to the drawings by numerals, 25 indicates the foundation, upon which are mounted two steel channel-beams 26, set edgewise parallel with each other and a slight distance apart, forming the bed-plate, upon which are mounted the housings 27 of the lower rolls.

28 28 indicate lugs riveted upon the upper face of the channel-beams, which form the bed-plate, between which on the bed-plate the housings are secured by wedge-keys 29, the lugs being secured by anchor-bolts 30, passing through them and between the channel-beams, having large washers 31 on them below the beams and secured by wedge-keys 32, (see Fig. 3,) and the housing being secured by similar anchor-bolts 33, having similar washers 34 and keys 35.

36 indicates the central parts of the housing to support bearings 37 38 of the lower rolls; 39, the housings, the upper parts of which receive the bearings of the upper roll; 40, end bars or straps projecting between the ends of housing and having flanged or hooked lower ends 41 projecting under flanges 42 of housings 27 and upper flanges or hooked ends 43 projecting over flanges 44 of housing.

46 47 indicate the strap-bolts, passing through the straps on each side and securing the housing and end bars rigidly together.

48 and 48ª indicate the bolts for pressing bearings 37 and 38 inward for adjusting them nearer together, the pressure of the upper roll and the cane passing through the mill keeping the bearings in contact with the bolts.

49 50 indicate the journals of the lower rolls 51 and 52.

53 indicates the guide, termed the "turn-plate," for causing the cane passed between the upper roll and lower roll 51 to pass between the upper roll and the lower roll 52 or, technically speaking, to guide the cane from the first compression-roller to the second compression-roller. This plate 53 has a vertical rib or flange 54, depending between the lower rolls 51 and 52 and round end journals 55, resting in bearing-plates 56, slidably mounted or simply laid upon the upper faces of brackets 57, which rest upon and are vertically adjusted by bifurcated wedges 58, impelled horizontally by screws 59, swiveled in the ends of the wedges, threaded through lugs 60, secured to the housings, and provided with hand-wheels 61, the brackets 57 being mounted in vertical openings in the housing. The turn-plate 53 has a rocking bar 62 keyed on each of its end journals, curved at each end to pass over the journals of the lower rolls and having eyes 63 at their ends.

64 and 65 indicate horizontal eyebolts secured at their inner ends to eyes 63 through lugs 66 and secured by nuts 67. Vertical eyebolts 68 and 69 depend from eyes 63, passed through brackets 70, bolted to the housing, and are secured by nuts 71.

72 indicates the upper roll, provided with round end journals 73, having squared ends 74, as have also the journals of lower rolls 51 and 52. Upon the top of journals 73 are half-bearings 75.

76 indicates the hydraulic cylinder, placed on the top of the upper-roller bearing and supplied by pipes 77 from the accumulator. (Not shown.)

78 indicates the hydraulic plunger, fitted to work in the open lower end of the cylinder.

79 indicates the mill-caps, comprising two edgewise channel-beams set parallel and at a slight distance apart, their upper edges being horizontal and their lower edges horizontal for a short distance in the center where they rest on top of the housing and from thence inclining upward to their outer ends, being made sufficiently strong to resist the pressure of the plunger. Bolts 80, provided with wide heavy washers 81, resting on top of the two cap-beams, pass downward between the cap-beams entirely outside of the housings and through between the beams of the bed-plate, being provided at their lower ends with heavy washers 82 below the bed-plate beams and key 83. The king-bolts 80 serve to hold down the mill-caps 79, which receive the upward pressure of the hydraulic cylinder and plunger in pressing the upper roll down upon the lower rollers.

84 indicates a triangular plate suspended over the hydraulic cylinder by a bolt 85, provided with a hand-wheel 86 for raising and lowering the plunger.

87 indicates chains by means of which the plunger 78 is suspended from the plate 84.

88 indicates slabs or plates of iron laid on top of bearings 75 to block up the plunger 78.

The triangular plate 84, bolt 85, hand-wheel 86, and chains 87 are for the purpose, as before stated, of suspending the plunger and raising and lowering it when desired when putting it in position or removing it, and the slabs or plates 88 simply act as washers.

89 indicates straps or plates set in recesses in the upper ends of the housings, and 90 strap-bolts passing through them to securely clamp them to and strengthen the upper ends of the housings.

As before stated, the journals of the three rolls have squared ends, and these ends are coupled to the gearing as follows: 91 indicates a coupling-shaft which is square and is coupled to the squared end 74 of the top roll by means of a sliding sleeve-coupling 93, while the squared ends 74 of the lower rolls are similarly coupled to square coupling-shafts 92 by sleeve-couplings 94. The square shaft 91 is coupled at its opposite end to the square end 96 of the gearing-shaft 99 by a similar coupling 95 and the shaft 92 to squared ends 98 of shaft 100 and 101 by couplings 97, said shaft 99 being in line with the upper roll and shaft 100 and 101 with the lower rolls.

102 indicates the housings for the gearing-shafts; 103, the fixed bearing for the upper shaft 99; 104 and 105, the adjustable bearings for the shafts 100 and 101, and 106 and 107 the screws threaded through the housings in the usual manner, with their points in contact with and serving the purpose of downwardly pressing or adjusting the bearings 104 and 105. A main gear-wheel on shaft 99 is driven from the engine through the medium of an intermediate shaft 109, carrying a gear-wheel 110, engaging a gear-wheel, (not shown, but located in the rear of said gear 110 and hidden thereby as the gearing is illustrated in Fig. 4,) on the engine-shaft 111, and a gear-wheel on the intermediate shaft, located in the rear of and engaging the main gear-wheel 108, as the gearing is illustrated in Fig 4.

The housings 102 for the gearing-shafts are supported on bed-plates constructed of two steel channel-beams 112, arranged as in the mill bed-plate, and the gearing is generally arranged in a manner similar to that of other well-known mills, except that the gear-wheels 113, 114, and 115 on the shafts 99, 100, and 101, respectively, are arranged within the gearing-housings instead of at the ends of the journals of the rolls themselves, the manifold advantages of this arrangement being hereinafter explained, said gear-weels 113, 114, and 115 being technically termed "crown-wheels" in this class of machinery. There is a hydraulic cylinder 76 over each bearing of the upper roll, and each is provided with a channel 116 with screw-threaded mouth in its inner side to receive the supply-pipes 77, which extend to a coupling 117, by which they are connected to a single pipe (not shown) leading from the accumulator.

The plunger 78 is packed by means of two cup-leathers 118 and 119, the latter within the former and both upon the upper end of the plunger. Within the flanges 120 of the leathers are two metal rings 121, simply turned and bored to form one within the other, with their open joints opposite each other to permit of expansion. Bearing on the inside of these rings are springs 122, pressed outward by radial stud-bolts 123, projecting from a plate or boss 124. The whole structure is firmly secured upon the plunger 78 by a center screw 125, passing through a cover-plate 126 into the end of the plunger, said cover-plate being provided with holes 127 through which to adjust the stud-bolts.

In assembling the parts the plunger and leathers are inclosed in a band 128, made of two halves secured together by screws 129, the completed band being of exactly the same interior diameter as the bore of the cylinder, and the upper edge being formed with an outside rabbet or groove 130 to receive a flange 131 on the lower end of the cylinder. This gives a flush joint between the band and the cylinder and permits the leathers to freely pass into the cylinder when desired. After the plunger is in place in the cylinder the band 128 is removed. The metal rings 121 keep the flanges of 120 of leathers 119 firmly pressed against the interior of the cylinder, as shown in Figs. 13 and 16, and prevent them being kinked or turned inward, as in Fig. 18.

132 indicates what I term "juice-plates," which are metallic rings secured upon the ends of rolls 51 and 52 by screws 133 at a short distance therefrom, forming channels 134 to receive flared-edge collars 135 on the ends of the upper roll.

The construction of my invention will be readily understood from the foregoing description, and its operation is as follows: Cane being fed to the first compression—that is to say, between the upper roll and the lower roll 51—it is crushed and passed on to the second compression between the upper roll and the lower roll 52. To properly guide the cane or bagasse, the turn-plate is made adjustable in various directions—to wit, laterally in either direction by means of the horizontal eyebolts 64 and 65, vertically by means of the wedge 58, and on its axis by means of the vertical eyebolts 69 and 70. The proper pressure is imparted to the top roll by the hydraulic plunger, and the plunger and cylinder are arranged above the top-roll bearings. This keeps uniform pressure under varying feed, permitting the roll to play up and down when irregularly fed. This overhead arrangement of the cylinder necessitates an extremely strong frame and perfect packing of the cylinder. These wants are supplied in the constructions described, and in this construction the king-bolts are outside of the housings, which permits of smaller rolls with larger journals and narrower turn-plates, resulting in greatly-improved work and increased strength. King-bolts are usually placed so that they will prevent the use of larger journals. Smaller rolls will do a given work with less pressure indicated in the hydraulic cylinder and are sharper at points of contact. Smaller rolls permit of narrower turn-plates, thus lessening friction in transferring pulp from the first to the second impression. The cylinder is more accessible at the top, and cutting out a large portion of the foundation is avoided.

By using two vertical steel channel-beams for the bed-plate a much superior bed-plate is secured and much less weight of metal is required, the arrangement being also extremely practical.

In mills as ordinarily erected the "crown-wheels" have been placed at the roll-housing, imposing undue work on the near coupling. This also causes the wheels in the rise and fall of the roll to wear irregularly. The friction on these wheels is directly against the hydraulic pressure, and as a consequence this irregular wear requires increased power. The crown-wheels in their old positions were also obstructions in adjusting and repairing. As the crown-wheels are now placed all of these annoyances and difficulties are avoided.

The packing I use on the plunger and the means for adjusting the plunger into the cylinder, as hereinbefore explained, fully meet all requirements and assure perfect working of the parts.

The juice-plates prevent the juice expressed from the cane running down upon the journals of the lower rolls. These plates are metallic rings, secured in seats at the ends of the lower rolls, wide enough to overlap the conical collars on the top roll, thus forming a deep trough, as shown in Fig. 3.

The flared edges of the collars 135 of the top roll will cause the juice to flow inward from the edge of the collar and prevent its being carried away with the pulp or bagasse. This is illustrated in Fig. 22, while Fig. 23 shows the different result attending the use of a straight edge or cylindrical collar. In this construction drops of juice remain on the outer edge of the collar to be wiped off as the pulp passes by, the pulp being always forced by the compression against the collar.

While I have illustrated and described what I consider to be the best means now known to me for carrying out my invention, I do not wish to be understood as restricting myself to the exact forms and constructions shown, as many slight changes therein or variations therefrom might suggest themselves to the ordinary mechanic, all of which would be clearly included within the limit and scope of my invention.

Having thus fully described my invention, what I claim as new, and desire to secure by Letters Patent of the United States, is—

1. In a sugar-cane mill, the combination with the upper and the two lower rolls, of a turn-plate pivotally mounted in a slidable bearing, a pair of rocking bars keyed on its journals, and horizontal adjusting-bolts engaging the rocking bars and lugs on the housing, substantially as described.

2. In a sugar-cane mill, the combination with the upper and the two lower rolls, of a turn-plate pivotally mounted in a slidable bearing, a pair of rocking bars keyed on its journals, and vertical adjusting-bolts engaging the rocking bars and lugs on the housing, substantially as described.

3. In a sugar-cane mill, the combination with the upper and the two lower rolls, of a turn-plate pivotally mounted in a slidable bearing, a pair of rocking bars keyed on its journals, and vertical and horizontal adjusting-bolts engaging the rocking bars and lugs on the housing, substantially as described.

4. In a sugar-cane mill, the combination, with the bed-plates and the mill-caps, each comprising two I-beams set on edge at a slight distance apart, lugs secured to the opposite ends of the beams, housings between the lugs, a wedge between each lug and one side of the housing, rolls journaled in the housings, bolts between the sets of beams comprising the plates and the caps, respectively, the bolts being beyond the housings, and washer-plates between the heads of the bolts and beams.

5. In a sugar-cane mill, the combination, with housings of rolls journaled therein, a turning-plate between the lower rolls provided with a vertical rib and a round journal at each end, a sliding bearing for each journal, and means for moving the bearing laterally and vertically and for rocking the plate in its bearings in any position.

6. In a sugar-cane mill, the combination with bearings, provided with threaded lugs, of rolls journaled in the bearings, a turning-plate between the lower rolls provided with a vertical rib, and a round journal at each end, a bearing for each journal, a bracket under the bearing, a bifurcated wedge under the bracket, a screw through the lug into the end of the wedge, and means for moving the bearings laterally upon the brackets and for rocking the plate in its bearings in any position.

7. In a sugar-cane mill, the combination with the upper roll, and the mill-cap, of a hydraulic cylinder, a plunger therein depending from the mill-cap over the roll-bearing, and a hoisting and lowering device suspending said cylinder, substantially as described.

8. In a sugar-cane mill, the combination with the upper roll, and the mill-cap, of a hydraulic cylinder, a plunger therein depending from the mill-cap over the roll-bearing, a plate above the plunger, chains suspending the cylinder above the roll-bearing, and a vertical screw in the mill-cap suspending the plate therefrom, substantially as described.

9. In a sugar-cane mill, the combination with housings, each of which is recessed in its upper portion for the upper roll and upon each side for the lower rolls, of rolls journaled in said housings, the lower rolls being adjustable laterally independently of each other and of the upper roll, a half-bearing on each end of the upper roll, a cap-piece on top of each housing, a hydraulic cylinder and piston between each half-bearing and the cap-piece thereabove and means for detachably holding the cylinder and piston in position.

10. In a sugar-cane mill, the combination, with housings, each of which is recessed in its upper portion for the upper roll, of rolls journaled in said housings, a half-bearing on each end of the upper roll, a cap-piece on top of each housing, a series of removable slabs on each half-bearing, a hydraulic cylinder and a plunger between the slabs and the cap-piece, and pipes leading to the cylinders.

PETER A. CAZES.

Witnesses:
LOUIS KRETS,
FRANK VIGNES.